(12) United States Patent
Kusaki et al.

(10) Patent No.: US 8,367,311 B2
(45) Date of Patent: Feb. 5, 2013

(54) METHOD FOR PRODUCING HOLLOW STRUCTURE

(75) Inventors: Wataru Kusaki, Jyoetsu (JP); Toshinobu Ishihara, Jyoetsu (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 189 days.

(21) Appl. No.: 12/909,329

(22) Filed: Oct. 21, 2010

(65) Prior Publication Data

US 2011/0123935 A1    May 26, 2011

(30) Foreign Application Priority Data

Nov. 24, 2009 (JP) ................................ 2009-265958

(51) Int. Cl.
*G03F 7/26* (2006.01)
(52) U.S. Cl. ....................................... 430/324; 430/329
(58) Field of Classification Search .................. 430/323, 430/329, 322, 324
See application file for complete search history.

(56) References Cited

U.S. PATENT DOCUMENTS

| | | | |
|---|---|---|---|
| 6,054,254 A * | 4/2000 | Sato et al. ....................... 430/322 |
| 6,120,131 A * | 9/2000 | Murthy et al. .................. 347/47 |
| 7,026,237 B2 * | 4/2006 | Lamb et al. .................... 438/623 |
| 2005/0042552 A1 * | 2/2005 | Gau et al. ....................... 430/322 |

FOREIGN PATENT DOCUMENTS

JP    A-2008-299165    12/2008

OTHER PUBLICATIONS

Hayashibara Shoji, Inc. homepage; 2003; 4 pages; Date Unknown.
Japan Vam & Poval Co., Ltd. homepage; 1 page; Date Unknown.

* cited by examiner

*Primary Examiner* — Kathleen Duda
*Assistant Examiner* — Caleen Sullivan
(74) *Attorney, Agent, or Firm* — Oliff & Berridge, PLC

(57) ABSTRACT

Provided is a fabrication method with which a laminate having a hollow structure can be produced more easily, while enabling to produce a multilayer structure as well. That is, a method for producing a hollow structure, a fabrication method by stacking-up a structural material among fabrication methods of a hollow structure on a substrate, the method including; a step of forming a structural material layer on a substrate, a step of forming a pattern on the structural material layer, a step of forming a sacrificial material layer by burying between the patterns with a water-soluble or an alkaline-soluble polymer as the sacrificial material to be buried between the patterns, a step of further laminating a structural material layer and forming a pattern on the structural material layer laminated, and a step of finally removing the sacrificial material after all of lamination is completed.

20 Claims, 2 Drawing Sheets

(1)

(2)

(3)

(4)

(5)

(6)

(7)

REMOVAL OF SACRIFICIAL MATERIAL LAYER

METHOD FOR PRODUCING HOLLOW STRUCTURE

BACKGROUND OF THE INVENTION

1. Field of the Invention

The present invention relates to a technology of producing a fine structure such as a semiconductor, MEMS, a photonic crystal, a micro flow path, μTAS, and Lab-on-Chip; and to a technology of forming a hollow laminate structure.

2. Description of the Related Art

A hollow fine structure can be used to make a filter or the like by a method such as gas suspension in a resin; in order to fabricate its inner structure with good reproducibility, there has been used a method such as printing and photolithography wherein a replication is done by using an original plate.

In general, a burying material is used to bury concavity and convexity on a substrate; in order to produce a hollow structure, its surface needs to be ground down till the outermost surface of the structure on the substrate is exposed. This is often called a sacrificial material when its function is included.

In production of a semiconductor or MEMS, a laminate having a hollow structure can be produced by a method in that, by making use of the difference in etching rate between a structural material and a sacrificial material to be buried between the structural material, after formation of a sacrificial material, for example a silicon oxide layer, and patterning thereafter, a structural material, for example polysilicon, is deposited, it is then subjected to patterning again, and then the sacrificial material is removed by etching to obtain a hollow structure. In this case, to obtain a multilayer, flattening of the surface as well as flattening to connect the structural materials themselves are necessary. By repeating these steps, a photonic crystal, for example, a three-dimensional wood pile structure, can be obtained. However, the processes are widely diverse, requiring an exposure equipment, equipments for CVD and etching, CMP, and the like; and thus its fabrication is not easy.

In a micro flow path, μTAS, and Lab-on-Chip, a molding method called a LIGA process or a LIGA-like process (a method in that a mold is formed and a structure is fabricated by pressing the mold to a structural material or casting a structural material into the mold), and a method called a resist molding method (a method in that a film is formed on a resist pattern by a structural material such as a resin and a metal alkoxide by using the resist pattern as a template, and then the resist pattern is removed through an opening thereby fabricating a hollow structure such as a flow path) are reported.

In any of the fabrication methods, a sacrificial layer that forms an opening on top of the hollow structure and supports a beam and a ceiling made of a structural material is necessary; thus formation of the sacrificial layer and final removal of the sacrificial layer tend to be complicated in the fabrication process.

Especially, in the burying step, a part other than the buried part in the sacrificial layer needs to be removed thereby exposing surface of the structural material. Thus, the resist molding method, which involves patterning of a buried part of a resist composition first thereby making the resist composition a sacrificial layer, is more convenient; but it is not a means for solving the problem in the method of forming an opening of the structural material to finally remove the resist composition of the sacrificial layer.

In Japanese Patent Laid-Open Publication No. 2008-299165, a method for fabricating a hollow structure by making use of the difference in photo-sensitivities to the wavelength of the light between two photo-sensitive layers is proposed; in this method, in fabricating the structure on and after the second layer, deterioration of the structural resistance due to the hollow structure remained intact in the process becomes a problem as the number of the layers increases. Even if, in order to form the hollow at the final step, development is done after exposure of the multilayer is finished, there are problems of resolution deterioration of the pattern of a underlying photosensitive layer accompanied with the lapse of time and repeat of the heating process, and of repeating precision to obtain an intended form. A layer sensitized by the light with the wavelength longer than 400 nm has also a restriction in resolution.

SUMMARY OF THE INVENTION

The present invention was made in view of the foregoing circumstances and has an object to provide a method for producing a laminate having a hollow structure easily and in low cost, while enabling to produce a multilayer structure as well.

The present invention was made to solve the problems as mentioned above; and provides a method for producing a hollow structure, a fabrication method by stacking-up a structural material among fabrication methods of a hollow structure on a substrate, wherein the method comprises at least:
(a) a step of forming a structural material layer on a substrate,
(b) a step of forming a pattern on the structural material layer,
(c) a step of forming a sacrificial material layer by burying between the patterns with a water-soluble or an alkaline-soluble polymer as the sacrificial material to be buried between the patterns,
(d) a step of further laminating a structural material layer and forming a pattern on the structural material layer laminated, and
(e) a step of finally removing the sacrificial material after all of lamination is completed.

According to the production method of a hollow structure of the present invention as mentioned above, there are no needs of the flattening treatment by CMP as well as etching at the time of removal; and thus a hollow structure can be produced easily and in low cost.

In this case, the steps (c) and (d) can be repeated until a hollow structure having an intended depth is obtained.

In this way, a hollow structure having an intended burying depth can be obtained easily by repeating the steps (c) and (d).

In addition, it is preferable that, between the step (c) and the step (d), the sacrificial material layer formed by the water-soluble polymer be reduced to the same height as the pattern of the structural material by using water or a mixture of water with a sacrificial material-insoluble solvent.

In this way, if the sacrificial material layer is formed by using the water-soluble polymer, the sacrificial material can be reduced easily to the same height as the pattern of the structural material by using water or a mixture of water with a sacrificial material-insoluble solvent.

In addition, it is preferable that, at the time of reducing the sacrificial material layer to the same height as the pattern of the structural material, the dissolution rate be controlled by drying the sacrificial material layer by heating.

In this way, if the sacrificial material is dried by heating, a thermal movement is given in a molecular level so that a solvent molecule can penetrate among polymer molecules thereby enabling the dissolution; in this way the dissolution rate can be easily controlled.

In addition, it is preferable to further include a heating step to fix the sacrificial material layer obtained after the sacrificial material layer is reduced to the same height as the pattern of the structural material.

In this way, if a heating step to fix the sacrificial material layer obtained is further included after the sacrificial material layer is reduced to the same height as the pattern of the structural material, mixing of a material to be used in the subsequent lamination step with the obtained sacrificial material layer and dissolution of the sacrificial material layer obtained in the step can be avoided.

In addition, it is preferable that a pre-wetting treatment be done by water or a solvent contained in the sacrificial material before the sacrificial material layer is formed in the step (C).

In this way, if a pre-wetting treatment is done by water or a solvent contained in the sacrificial material before the sacrificial material layer is formed in the step (C), an affinity can be given between the sacrificial material and the substrate surface, thereby enabling to improve applicability of the sacrificial material.

In addition, it is preferable to use polyvinyl alcohol as the water-soluble polymer.

In this way, if polyvinyl alcohol is used as the water-soluble polymer (as the sacrificial material), the sacrificial material is difficult to be affected by other processes because it can easily crystallize; thus the sacrificial material can be more easily removed all at once at the end, thereby enabling to produce a structure having hollow structures widely formed in many layers.

In addition, as the sacrificial material comprising the polyvinyl alcohol, a mixture of two or more of polymers having different saponification values, molecular weights, or viscosities of the polyvinyl alcohol can be used.

Accordingly, if a mixture of two or more of polymers having different saponification values, molecular weights, or viscosities of the polyvinyl alcohol are used, the rate at the time of dissolution of the sacrificial material layer can be controlled.

In addition, in the method for reducing the sacrificial material layer formed by using the polyvinyl alcohol to the same height as the pattern of the structural material, it is preferable that the reduction to the same height as the pattern of the structural material be done by using water or a mixture of water with a sacrificial material-insoluble solvent having temperature of water or the mixture in the range of 30 to 60° C.

Accordingly, if water or a mixture of water with a sacrificial material-insoluble solvent having temperature of water or the mixture in the range of 30 to 60° C. is used, a suitable dissolution rate of the sacrificial material layer can be obtained.

In addition, as the method to finally remove the sacrificial material layer formed by using the polyvinyl alcohol, a hot water whose temperature is 85° C. or higher can be used.

Accordingly, if a hot water whose temperature is 85° C. or higher is used, the sacrificial material layer can be removed easily.

In addition, a positive photoresist can also be used as the alkaline-soluble polymer. In the method for reducing the sacrificial material layer formed by using the positive photoresist to the same height as the pattern of the structural material, it is preferable that the reduction to the same height as the pattern of the structural material be done by exposure and development.

In this way, if a positive photoresist is used as the sacrificial material, and if exposure and development are done, the sacrificial material layer formed of the photoresist can be easily reduced to the same height as the pattern.

In addition, it is preferable that the method to finally remove the sacrificial material layer formed by using the positive photoresist be done by exposure, heating, and development.

In this way, if exposure, heating, and development are done to finally remove the sacrificial material layer formed by using the positive photoresist, the sacrificial material formed of the positive photoresist can be easily removed.

As explained above, according to the present invention, it became possible to produce a laminate having a hollow structure easily and in low cost, and in addition, a structure having it made multilayer can be produced easily and conveniently.

DESCRIPTION OF THE PREFERRED EMBODIMENTS

In the following, embodiments of the present invention will be explained, but the present invention is not restricted by them.

As mentioned above, a method for final removal of a sacrificial layer in production of a hollow structure tend to be complicated in the production process; and when fabricating the structure on and after a second layer, deterioration of the structural resistance due to the hollow structure remained intact in the process has become a problem as the number of layers increased.

Inventors of the present invention carried out an extensive investigation to solve the problems; and as a result, the inventors found that, when a water-soluble or an alkaline-soluble polymer was used as a sacrificial material to form a hollow structure, final removal of the sacrificial material after all of lamination was completed could be done easily and unfailingly, and that a low cost could be realized as well; and thus the inventors could achieve the present invention.

That is, a method for producing a hollow structure of the present invention is, among fabrication methods of a hollow structure on a substrate, a fabrication method by stacking-up a structural material, wherein the method comprises at least:
(a) a step of forming a structural material layer on a substrate,
(b) a step of forming a pattern on the structural material layer,
(c) a step of forming a sacrificial material layer by burying between the patterns with a water-soluble or an alkaline-soluble polymer as the sacrificial material to be buried between the patterns,
(d) a step of further laminating a structural material layer and forming a pattern on the structural material layer laminated, and
(e) a step of finally removing the sacrificial material after all of lamination is completed.

In the following, embodiments of the present invention will be explained more concretely with reference to the production method shown in the figure; but the present invention is not limited to them.

Figure 1:
FIG. 1 is a schematic diagram showing one example of the method for producing a hollow structure in the present invention.
Figure 1:
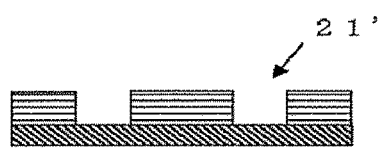
Figure 1:
Figure 1:
Figure 1:
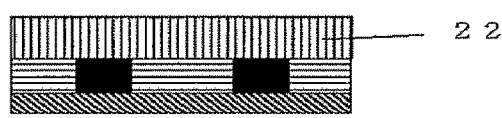
Figure 1:
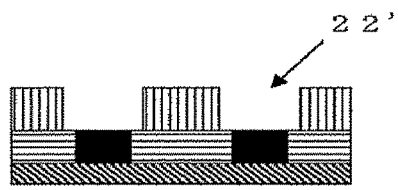
Figure 1:
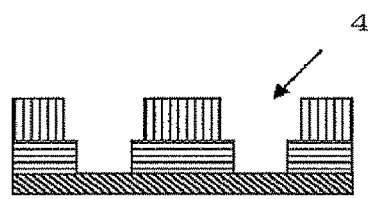

FIG. 1 is a schematic diagram showing one example of the method for producing a hollow structure in the present invention.

In the present invention, for example, a structural material layer 21 is formed by applying a structural material on a substrate 1 (FIG. 1-(1)), then a pattern 21' is formed on the structural material layer (FIG. 1-(2)). Thereafter, a sacrificial material is buried between the patterns 21' to form a sacrificial material layer 3 (FIG. 1-(3)). Then, after the sacrificial material layer 3 is reduced to the same height as the structural material layer 21 (FIG. 1-(4)), a structural material is further applied to laminate a structural material layer 22 and then a pattern 22' is formed (FIG. 1-(5) and FIG. 1-(6)). Finally, the sacrificial material layer is removed to produce a hollow structure 4 (FIG. 1-(7)).

In the present invention, when producing a hollow structure like this, a hollow structure (laminate) having an intended depth can be produced easily by repeating the steps FIG. 1-(3) to FIG. 1-(6).

The most characteristic nature of the present invention resides in that, when patterning is done by using a negative resist as the structural material, all of materials used in the process is liquid, and thus the production can also be done, among conventional semiconductor processes, only with an instrument used in lithography, an exposure instrument, and an instrument called a coater developer.

A hollow structure fabricated by this method has the controlled position of the hollow structure with no bias; thus it is particularly useful for the structure requiring a space regioselectivity such as a molecular sieve, a photonic crystal, µTAS.

Patterning process can be done by any method as far as it can be used in patterning such as a photolithography by various light sources, an ink-jet, a screen printing, and a molding by a template.

There is no limit in material of the substrate: it includes a material that can be printed on it, such as a paper, a cloth, and plastics; a silicon wafer and a silicon wafer whose surface is covered with various films; quartz; and the like.

Structural materials, for example a negative resist, a thermosetting resin, a silicon oxide film including quartz, a silicon nitride film, a CVD laminated film (such as SiC, GaAs, and InP), and the like, used in such fields as semiconductor, LED, and a liquid crystal can be used; but a material capable of pattern formation by such processes as development and etching is more preferable.

In the present invention, a sacrificial material layer is formed by using a water-soluble or an alkaline-soluble polymer as the sacrificial material that buries the pattern thus formed.

The water-soluble polymer material includes such materials as cellulose, pullulan, homopolymer or copolymer of polyvinyl pyrrolidone, and polyvinyl alcohol (poval), wherein they may be substituted partially.

Among them, cellulose and polyvinyl alcohol have a good organic solvent resistance and are easy to have different dissolution rates, before and after drying, into water or a base, while polyvinyl alcohol is more preferable because the film shrinkage before and after drying is small.

Cellulose has three hydroxyl groups on the glucose unit; and thus many cellulose derivatives can be obtained by modifying the hydroxyl groups with various substituting groups. Their solubility into various solvents changes with the substituent. Examples of the water-soluble cellulose derivative include methyl cellulose, hydroxypropyl cellulose, hydroxypropyl methyl cellulose, hydroxypropyl methyl cellulose acetate succinate, hydroxyethyl cellulose, and carboxymethyl cellulose. On the other hand, examples of the water-insoluble cellulose derivative include low-substituted hydroxypropyl cellulose, hydroxypropyl methylcellulose phthalate, and cellulose acetate.

Polyvinyl pyrrolidone is a synthetic polymer; because water-solubility is given to the polymer by the vinyl pyrrolidone moiety, there are many copolymers of it. Examples of them include vinyl acetate-vinyl pyrrolidone copolymer, vinyl pyrrolidone-styrene copolymer, vinyl pyrrolidone-acrylate copolymer, and vinyl pyrrolidone-methacrylate copolymer.

Polyvinyl alcohol can change its dissolution rate easily by its saponification value. On the other hand, in order to control the fluctuation among lots of the material be small, a mixture of two or more of polymers having different molecular weights or viscosities, like a polymer having a substituent of an introduced functional group such as a carbonyl group and a carboxyl group, or a mixture of them may also be used.

A polymer material that is made alkaline-soluble, for example, by partially substituting the foregoing water-soluble polymer material can be used as the alkaline-soluble polymer material.

It can be mentioned, as the partially substituted cellulose, hydroxypropyl methyl cellulose phthalate, hydroxypropyl methyl cellulose acetate succinate, cellulose acetate hexahydrophthalate, hydroxypropyl methyl cellulose acetate phthalate, and hydroxypropyl methyl cellulose hexahydrophthalate.

In addition, a positive photoresist such as the one having partially substituted polyimide can also be used. Specifically, "Developable BARC", which is used in a semiconductor manufacturing process, may be mentioned.

On the other hand, in the sacrificial material, an additive to prevent shrinkage upon formation of its film may also be used. In this case, the additive is required to be of a low molecular weight, not to deposit upon mixing, and in particular to have a high affinity with a polymer in the sacrificial material. Examples of the additive are ethylene glycols such as ethylene glycol, diethylene glycol, and tetraethylene glycol; substituted ethylene glycols such as diethylene glycol monomethyl ether, diethylene glycol dimethyl ether, and diethylene glycol diethyl ether; and, in like wise, propane-1, 2,3-triol (glycerin) and its substituted compound.

In addition, a surfactant may be used as the additive for the sacrificial material in order to improve applicability of the sacrificial material.

In the present invention, it is preferable that a pre-wetting treatment be done before formation of the sacrificial material layer in order to give an affinity between the sacrificial material and the substrate surface.

Such pre-wetting treatment may be done, for example in the case of using a water-soluble polymer as the sacrificial material, by water-rinsing or by merely applying water then spinning it off, before application of the sacrificial material. Alternatively the treatment may be done by a solvent contained in the sacrificial material.

It is preferable that, in order to further laminate a structural material layer, the sacrificial material layer thus formed be flattened (that is, the sacrificial material layer is reduced to the same height as the pattern of the structural material layer); for example, a method for reducing the sacrificial material layer by using a solvent may be mentioned.

As the solvent to be used for reducing the sacrificial material layer to an intended height, water may be used for a water-soluble polymer and an alkaline water for an alkaline-soluble polymer; but in view of manipulating dissolution rate to obtain exactly the same heights, a mixture of it with a solvent that does not dissolve the sacrificial material layer but is miscible with water may be used.

Examples of the insoluble solvent include a solvent such as ethyl acetate and butyl acetate in the case of polyvinyl pyrrolidone; and alcohols such as ethanol and esters such as ethyl lactate and propylene glycol monomethyl ether acetate in the case of pullulan or polyvinyl alcohol.

In the case that a positive photoresist is used as the alkaline-soluble polymer, the sacrificial material layer can be reduced by exposure and development of the sacrificial material layer.

On the other hand, a mixture of an organic solvent that can dissolve a polymer in the sacrificial material with an organic solvent that cannot dissolve the polymer can be used; in the case of a partly substituted cellulose, a mixture of acetonitrile and water may be used because it is soluble in an organic solvent such as acetonitrile but not soluble in water. In the case of polyvinyl alcohol, a dissolvable organic solvent such as dimethyl sulfoxide may be used as the mixture with an organic solvent such as the foregoing alcohols and esters such as ethyl lactate and propylene glycol monomethyl ether acetate.

Solubility of a water-soluble polymer can be changed by introducing a substituent group into it, so that introduction of a substituent group can be used as a method for manipulating dissolution rate. For example, in the case of pullulan, acetylation or cyanoethylation can be used. In accordance with the introduction ratio, solubilities into acetone, chloroform, ethyl acetate, or ethanol are different (refer to the product information of pullulan in a home page of Hayashibara Shoji, Inc.).

In cellulose and polyvinyl alcohol, their dissolution rates are different depending on temperature of the dissolving water; as one method for manipulating dissolution rate so as to reduce the film to an intended height, a method of changing temperature of pouring or soaking water can be used. This temperature is dependent on the water-soluble polymer to be used; for example in the case of polyvinyl alcohol, the temperature for dissolution is different depending on viscosity, i.e., degree of polymerization or molecular weight. However, in practical point of view, a room temperature and, on the other hand, a high temperature that gives too high dissolution rate are meaningless; thus, it is preferable that the temperature be controlled in the range of 30 to 60° C. (refer to the data of poval—solubility of film—in a home page of Japan VAM & Poval Co., Ltd.).

As to the polymer that forms a hydrogen bond, i.e., the polymer that can "crystallize" as it is called, between functional groups (a hydroxyl group and a carboxyl group) of the polymer due to compactness among polymer molecules (which depends on rigidity and steric structure of a main chain), dissolution rate of the sacrificial material layer can also be managed by controlling the degree of drying by changing the temperature and the time for heating.

It is preferable that the sacrificial material layer whose height is reduced to the same height as the pattern of the structural material as mentioned method be subjected to a heating step to fix the sacrificial material layer in order to prevent mixing with the structural material to be used in the step of further lamination and dissolution of the sacrificial material layer in the process from occurring.

Final removal of the sacrificial material to obtain a hollow structure can be done by a method such as rinsing with water, soaking in hot water, washing out by pouring hot water, and dissolution with simultaneous development of the resist, though it can be selected widely depending on the sacrificial material to be used.

In particular, in the case that the sacrificial material is polyvinyl alcohol, the polyvinyl alcohol sacrificial material can be removed by using a hot water having temperature of 85° C. or higher; and in the case of positive photoresist, the positive photoresist sacrificial material can be removed by re-exposure which is done after the height is controlled by the foregoing exposure and development, heating, and development.

EXAMPLES

In the following, the present invention will be explained concretely by Examples, but the present invention is not limited by the following Examples or the like.

Production Example 1

Production of Negative Resist (for Structural Material)

As the polymer component 100 parts by weight of p-hydroxy styrene-styrene copolymer (styrene copolymer ratio of 15%, average molecular weight of 10,000, and dispersity of 1.10), as the photo-acid-generating agent 5 parts by weight of triphenylsulfonium p-toluenesulfonate, as the crosslinking agent 10 parts by weight of 1,3,4,6-tetrakis(methoxymethyl) glycol ural, as the base 0.5 parts by weight of tris(2-methoxymethoxyethyl)amine, and the surfactant were mixed and dissolved in a solvent mixture of 670 parts by weight of ethyl lactate and 270 parts by weight of propyleneglycol monomethyl ether acetate (PGMEA); and the resulting mixture solution was filtered through a 0.1-μm filter of Teflon (registered trade mark) to obtain a negative resist solution.

Production Example 2

Production of an Aqueous Polyvinyl Alcohol Solution (for Sacrificial Material)

Interim-saponified polyvinyl alcohol (VM-17 manufactured by Japan VAM & Poval Co., Ltd.: saponification value of 95 to 97%) was dissolved into water with stirring in a water bath heated at 95° C. to obtain a 6% by weight of its aqueous solution.

Production Example 3

Production of Aqueous Ethanol Solution

Ethanol and water were mixed with the volume ratio of 2 to 1 to obtain an aqueous ethanol solution.

Manipulation Example 1 of Dissolution Rate of the Sacrificial Layer

The aqueous polyvinyl alcohol solution obtained by Production Example 2 was spin-coated on a wafer to obtain a polyvinyl alcohol layer having the film thickness of 500 nm. Subsequently, it was heated at each temperature for 60 seconds and then rinsed by water for 5 seconds at 100 rotations per second; at this time change in the film thickness was measured. It became apparent that the resolution rate could be manipulated as shown below.

TABLE 1

| Heating Temperature | Film Thickness Remained | Reduction Amount |
|---|---|---|
| 120° C. | 0 nm | 500 nm |
| 140° C. | 80 nm | 420 nm |
| 150° C. | 260 nm | 240 nm |
| 160° C. | 480 nm | 20 nm |

TABLE 1-continued

| Heating Temperature | Film Thickness Remained | Reduction Amount |
|---|---|---|
| 170° C. | 497 nm | 3 nm |
| 180° C. | 500 nm | 0 nm |

Manipulation Example 2 of Dissolution Rate of the Sacrificial Layer

The aqueous polyvinyl alcohol solution obtained by Production Example 2 was spin-coated on a wafer to obtain a polyvinyl alcohol layer having the film thickness of 500 nm. Subsequently, it was heated at each temperature for 60 seconds and then puddled with 2.38% by weight of an aqueous tetramethylammonium hydroxide solution for 60 seconds; at this time change in the film thickness was measured. It became apparent that the resolution rate could be manipulated as shown below.

TABLE 2

| Heating Temperature | Film Thickness Remained | Reduction Amount |
|---|---|---|
| 120° C. | 0 nm | 500 nm |
| 140° C. | 0 nm | 500 nm |
| 150° C. | 0 nm | 500 nm |
| 160° C. | 50 nm | 495 nm |
| 170° C. | 186 nm | 314 nm |
| 180° C. | 500 nm | 0 nm |

Production Example 4

Partly-saponified polyvinyl alcohol (VP-18 manufactured by Japan VAM & Poval Co., Ltd.: saponification value of 86 to 90%) was dissolved into water with stirring in a water bath heated at 95° C. to obtain a 6% by weight of its aqueous solution.

Manipulation Example 3 of Dissolution Rate of the Sacrificial Layer

The aqueous polyvinyl alcohol solution obtained by Production Example 4 was spin-coated on a wafer to obtain a polyvinyl alcohol layer having the film thickness of 560 nm. Subsequently, it was puddled for 10 seconds with the aqueous ethanol solution obtained by Production Example 3 with different mixing ratio of water to ethanol; at this time change in the film thickness was measured. It became apparent that the resolution rate could be manipulated as shown below.

TABLE 3

| Water:Ethanol Mixing Ratio | Film Thickness Remained | Reduction Amount |
|---|---|---|
| 3:1 | 60 nm | 500 nm |
| 2:3 | 175 nm | 385 nm |
| 1:3 | 505 nm | 55 nm |

Method for Resist Patterning

The negative resist solution obtained in Production Example 1 was spin-coated on a HMDS-treated silicon wafer and then heated on a hot plate at 100° C. for 90 seconds to obtain a wafer attached with a resist film of 430 nm film thickness. This was exposed by using an excimer laser scanner (NSR-S203B manufactured by Nikon Corp.: NA of 0.68, σ of 0.75, ⅔ annular illumination, chrome mask) with controlled exposure amount and focus depth. Subsequently, it was heated on a hot plate at 120° C. for 90 seconds and then developed with 2.38% by weight of an aqueous tetramethylammonium hydroxide solution for 60 seconds, thereby obtaining a 0.25 μm line-and-space pattern formed on the substrate. Depending on the situation, in order to facilitate the crosslinking reaction inside the resist pattern, the whole may be further exposed to a KrF beam and heated at 120° C.

Then, after the resist pattern was pre-wetted by water, the aqueous polyvinyl alcohol solution obtained in Production Example 2 was spin-coated on a Bare's silicon wafer with the rotation numbers pre-set so as to give 400 nm of the film thickness of the polyvinyl alcohol layer. On it, the aqueous ethanol solution obtained in Production Example 3 was poured, and after allowed to stand for 10 seconds, the aqueous ethanol solution was removed and dried by rotation. Then, it was heated on a hot plate at 200° C. for 60 seconds; in this way polyvinyl alcohol could be buried between the 0.25 μm line-and-space pattern.

Then, similarly to those in the step of forming the first resist pattern, the negative resist solution was applied, exposed, and developed to obtain a 0.40-μm contact hole pattern on its surface.

Thereafter, it was soaked in a hot water heated at 90° C. to finally remove the sacrificial material layer formed of polyvinyl alcohol.

Figure 2:
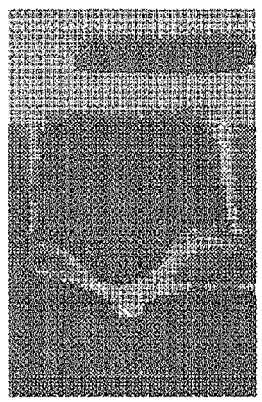
FIG. 2 shows a hollow structure produced by Examples.
Figure 2:
Figure 2:
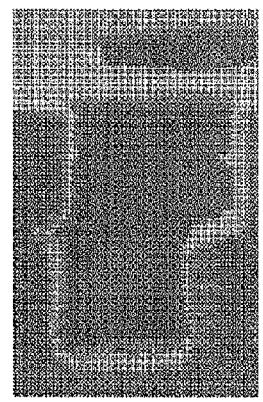

The hollow structure obtained after it was soaked in a hot water heated at 90° C. and then dried is shown in FIG. 2.

In the method of the present invention as executed above, unlikely to the conventional methods, the flattening treatment of the sacrificial material layer by CMP and etching at the final removal of the sacrificial material layer are not done; thus the cost of introducing those apparatuses and the running cost can be significantly reduced. In addition, as shown in FIG. 2, the sacrificial material layer in the obtained hollow structure could be removed unfailingly and its form was extraordinarily in good condition.

In addition, before the step of soaking in a hot water heated at 90° C., burying of polyvinyl alcohol and resist patterning were repeated in a way similar to those in the above to obtain a multilayer structure; thereafter it was soaked in a hot water heated at 90° C. and then dried. In this way a multilayer structure with a good and deep hollow could be obtained.

It must be noted here that the present invention is not limited to the foregoing embodiments. The foregoing embodiments are mere examples; any embodiments composed of substantially the same technical concept as described in the claims of the present invention and expressing a similar effect are included in the technical scope of the present invention.

What is claimed is:

1. A method for producing a hollow structure by stacking-up a structural material of the hollow structure on a substrate, wherein the method comprises at least:
    (a) a step of forming a structural material layer on a substrate,
    (b) a step of forming a pattern on the structural material layer,
    (c) a step of forming a sacrificial material layer by burying between the patterns a water-soluble polymer as a sacrificial material and reducing the sacrificial material layer, formed by using the water-soluble polymer, to a same height as the pattern of the structural material by using water or a mixture of water with a sacrificial material-insoluble solvent, (d) a step of further laminating a structural material layer and forming a pattern on the structural material layer laminated, and (e) a step of finally removing the sacrificial material after all of lamination is completed.

2. The method for producing the hollow structure according to claim 1, wherein the steps (c) and (d) are repeated until a hollow structure having an intended depth is obtained.

3. The method for producing the hollow structure according to claim 2, wherein at a time of reducing the sacrificial material layer to the same height as the pattern of the structural material, a dissolution rate of the sacrificial layer is controlled by drying the sacrificial material layer by heating.

4. The method for producing the hollow structure according to claim 3, wherein a heating step to fix the sacrificial material layer obtained is further included after the sacrificial material layer is reduced to the same height as the pattern of the structural material.

5. The method for producing the hollow structure according to claim 4, wherein a pre-wetting treatment is done by water or a solvent contained in the sacrificial material before the sacrificial material layer is formed in the step (c).

6. The method for producing the hollow structure according to claim 5, wherein polyvinyl alcohol is used as the water-soluble polymer.

7. The method for producing the hollow structure according to claim 6, wherein as the sacrificial material comprising the polyvinyl alcohol, a mixture of two or more of polymers having different saponification values, molecular weights, or viscosities of the polyvinyl alcohol is used.

8. The method for producing the hollow structure according to claim 7, wherein in the method for reducing the sacrificial material layer formed by using the polyvinyl alcohol to the same height as the pattern of the structural material, the reduction to the same height as the pattern of the structural material is done by using water or a mixture of water with a sacrificial material-insoluble solvent having temperature of water or the mixture in the range of 30 to 60° C.

9. The method for producing the hollow structure according to claim 8, wherein as the method to finally remove the sacrificial material layer formed by using the polyvinyl alcohol, a hot water whose temperature is 85° C. or higher is used.

10. The method for producing the hollow structure according to claim 6, wherein in the method for reducing the sacrificial material layer formed by using the polyvinyl alcohol to the same height as the pattern of the structural material, the reduction to the same height as the pattern of the structural material is done by using water or a mixture of water with a sacrificial material-insoluble solvent having temperature of water or the mixture in the range of 30 to 60° C.

11. The method for producing the hollow structure according to claim 2, wherein a heating step to fix the sacrificial material layer obtained is further included after the sacrificial material layer is reduced to the same height as the pattern of the structural material.

12. The method for producing the hollow structure according to claim 1, wherein at a time of reducing the sacrificial material layer to the same height as the pattern of the structural material, a dissolution rate of the sacrificial layer is controlled by drying the sacrificial material layer by heating.

13. The method for producing the hollow structure according to claim 12, wherein a heating step to fix the sacrificial material layer obtained is further included after the sacrificial material layer is reduced to the same height as the pattern of the structural material.

14. The method for producing the hollow structure according to claim 1, wherein a heating step to fix the sacrificial material layer obtained is further included after the sacrificial material layer is reduced to the same height as the pattern of the structural material.

15. The method for producing the hollow structure according to claim 1, wherein a pre-wetting treatment is done by water or a solvent contained in the sacrificial material before the sacrificial material layer is formed in the step (c).

16. The method for producing the hollow structure according to claim 1, wherein polyvinyl alcohol is used as the water-soluble polymer.

17. The method for producing the hollow structure according to claim 16, wherein as the sacrificial material comprising the polyvinyl alcohol, a mixture of two or more of polymers having different saponification values, molecular weights, or viscosities of the polyvinyl alcohol is used.

18. The method for producing the hollow structure according to claim 17, wherein in the method for reducing the sacrificial material layer formed by using the polyvinyl alcohol to the same height as the pattern of the structural material, the reduction to the same height as the pattern of the structural material is done by using water or a mixture of water with a sacrificial material-insoluble solvent having temperature of water or the mixture in the range of 30 to 60° C.

19. The method for producing the hollow structure according to claim 16, wherein in the method for reducing the sacrificial material layer formed by using the polyvinyl alcohol to the same height as the pattern of the structural material, the reduction to the same height as the pattern of the structural material is done by using water or a mixture of water with a sacrificial material-insoluble solvent having temperature of water or the mixture in the range of 30 to 60° C.

20. The method for producing the hollow structure according to claim 16, wherein as the method to finally remove the sacrificial material layer formed by using the polyvinyl alcohol, a hot water whose temperature is 85° C. or higher is used.

* * * * *